(12) United States Patent
Yao et al.

(10) Patent No.: US 10,909,228 B2
(45) Date of Patent: Feb. 2, 2021

(54) SERVER-SIDE AUTHENTICATION POLICY DETERMINATION FOR MOBILE APPLICATIONS

(71) Applicant: Box, Inc., Redwood City, CA (US)

(72) Inventors: Rico Sebastian Yao, San Jose, CA (US); Tom Carpel, East Palo Alto, CA (US); Oluwatosin Onafowokan, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 248 days.

(21) Appl. No.: 16/040,466

(22) Filed: Jul. 19, 2018

(65) Prior Publication Data

US 2019/0026455 A1    Jan. 24, 2019

Related U.S. Application Data

(60) Provisional application No. 62/534,592, filed on Jul. 19, 2017.

(51) Int. Cl.
| | |
|---|---|
| *H04L 29/06* | (2006.01) |
| *G06F 21/33* | (2013.01) |
| *H04L 9/32* | (2006.01) |
| *H04L 29/08* | (2006.01) |

(52) U.S. Cl.
CPC .......... *G06F 21/335* (2013.01); *H04L 9/3213* (2013.01); *H04L 9/3263* (2013.01); *H04L 63/0823* (2013.01); *H04L 63/102* (2013.01); *H04L 67/02* (2013.01)

(58) Field of Classification Search
CPC ... G06F 21/335; H04L 9/3213; H04L 9/3263; H04L 63/0823; H04L 63/102; H04L 67/02

USPC .......................................................... 726/5
See application file for complete search history.

(56) References Cited

U.S. PATENT DOCUMENTS

| | | | | |
|---|---|---|---|---|
| 6,097,813 | A * | 8/2000 | Vanstone | .............. H04L 9/3249 380/30 |
| 8,625,796 | B1 * | 1/2014 | Ben Ayed | ........... H04L 63/0853 380/258 |
| 8,719,898 | B1 | 5/2014 | Barton et al. | |
| 9,237,145 | B2 | 1/2016 | Sondhi et al. | |
| 9,253,210 | B2 | 2/2016 | Muppidi et al. | |

(Continued)

*Primary Examiner* — Michael S McNally
(74) *Attorney, Agent, or Firm* — Vista IP Law Group, LLP

(57) ABSTRACT

Systems for collaboration system application authentication. A collaboration system identifies a downloadable application that comprises at least one operation that functions only after obtaining user authentication credentials. The application is configured to invoke one of a plurality of different authentication procedures based on a set of server-provided authentication style parameters. After establishing a connection between an application server that interfaces with the user device that runs the application, the collaboration system determines the set of authentication style parameters, wherein the determination is based at least in part on an identification of the user device or based at least in part on an identification of a user of the user device. The application server sends at least a portion of the set of authentication style parameters to the user device. The application obtains user authentication credentials by invoking one or more authentication procedures based on received server-provided authentication style parameters.

20 Claims, 11 Drawing Sheets

(56) References Cited

U.S. PATENT DOCUMENTS

| | | | |
|---|---|---|---|
| 9,270,674 B2 | 2/2016 | Lang et al. | |
| 9,378,345 B2* | 6/2016 | Zhang | G06F 21/31 |
| 9,473,533 B2 | 10/2016 | Faltyn et al. | |
| 9,721,087 B1* | 8/2017 | Duchin | G06F 21/45 |
| 2011/0296489 A1* | 12/2011 | Fernandez Alonso | H04L 63/08 726/1 |
| 2013/0019291 A1* | 1/2013 | Zou | H04L 63/08 726/6 |
| 2013/0198822 A1* | 8/2013 | Hitchcock | G06F 21/00 726/6 |
| 2013/0212018 A1* | 8/2013 | Trifiletti | G06Q 20/322 705/44 |
| 2014/0040979 A1 | 2/2014 | Barton et al. | |
| 2014/0237248 A1* | 8/2014 | Striem-Amit | H04L 9/0844 713/171 |
| 2015/0089571 A1 | 3/2015 | Srinivasan et al. | |
| 2015/0089622 A1 | 3/2015 | Sondhi et al. | |
| 2016/0036790 A1* | 2/2016 | Shastry | H04L 63/0876 713/168 |
| 2016/0320927 A1* | 11/2016 | Labranche | H04L 51/36 |
| 2017/0147796 A1 | 5/2017 | Sardesai et al. | |
| 2018/0005233 A1* | 1/2018 | Trifiletti | G06Q 20/401 |
| 2018/0240118 A1* | 8/2018 | Lee | H04W 12/0609 |

\* cited by examiner

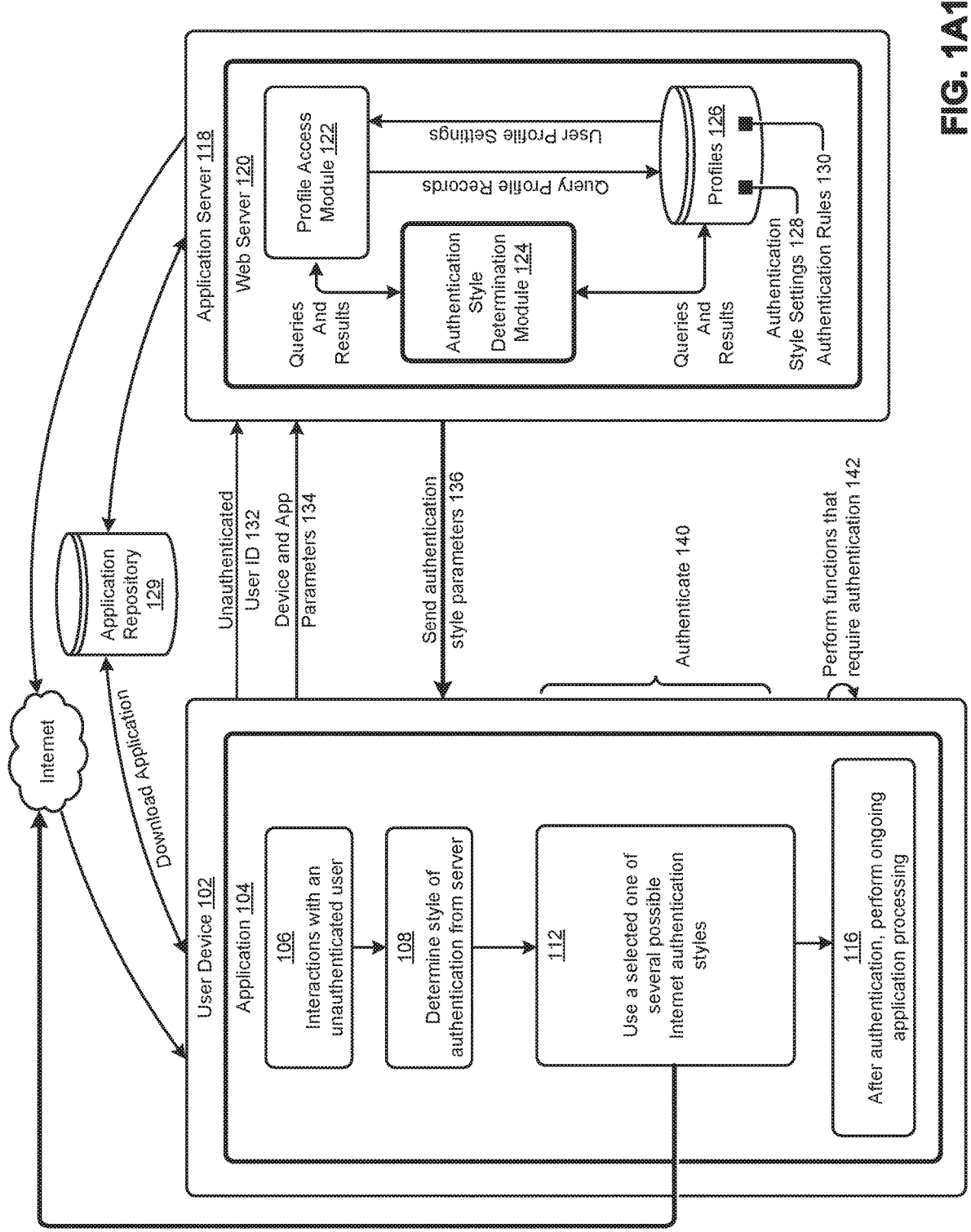
FIG. 1A1

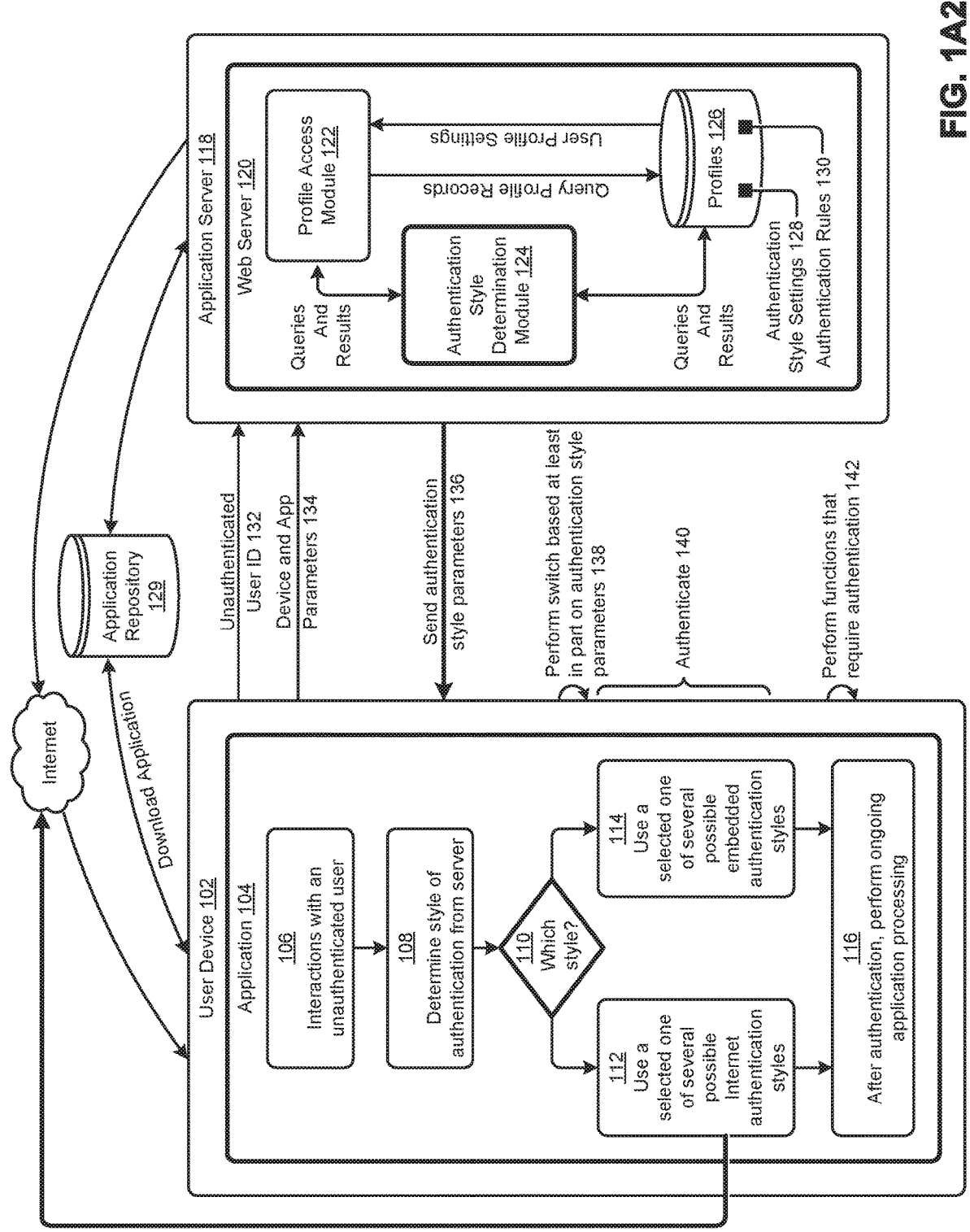
FIG. 1A2

SERVER-SIDE AUTHENTICATION POLICY DETERMINATION FOR MOBILE APPLICATIONS

CROSS-REFERENCE TO RELATED APPLICATION(S)

The present application claims the benefit of priority to U.S. Provisional Application No. 62/534,592 filed on Jul. 19, 2017 and titled "SERVER-SIDE AUTHENTICATION POLICY DETERMINATION FOR MOBILE APPLICATIONS", which is hereby incorporated by reference for all purposes in its entirety.

FIELD

This disclosure relates to Internet authentication, and more particularly to techniques for server-side authentication policy determination for mobile applications.

BACKGROUND

Many applications demand user authentication in order to perform certain operations. In some cases, user authentication can be performed using a username and password pair that is typed in by the user while running the application, however this authentication mechanism has numerous security vulnerabilities. In other cases, user authentication can be performed using a username and a certificate. In this latter case, a digital security certificate is needed in combination with the username, which is only a slight improvement over the username/password pair mechanism. In still other cases, the application might access resources of an external browser (if available) to aid in carrying out an authentication protocol, however use of an external browser introduces still further security vulnerabilities.

Thus, app developers are faced with a series of pros and cons when selecting authentication components to assist in authenticating a user at runtime.

Unfortunately, the problem of making development-time choices and assessing corresponding pro-con tradeoffs is further exacerbated by the fact that a choice of a particular authentication style and/or web component at one moment in time (e.g., at the time of application development) might not be the best or desired choice at a later moment in time (e.g., when the application is executed). Still further exacerbating the problem is that one user or deployer of an application might want to change their user authentication procedures based at least in part on the user or type of user (or changes thereto), and/or based at least in part on the nature of the data that is accessed by the application, and/or based at least in part on information that cannot be known at the time of development of the application, etc.

What is needed is a way to deploy an application such that the determination of what style of user authentication is employed can be determined at runtime rather than at the time of application development.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for server-side authentication policy determination for mobile applications, which techniques advance the relevant technologies to address technological issues with legacy approaches. More specifically, the present disclosure describes techniques used in systems, methods, and in computer program products for server-supported authentication policy determination based at least in part on profiles. Certain embodiments are directed to technological solutions for deploying an application with authentication style switch logic embedded in the application such that the authentication style can be determined by a server each time the application is executed.

The disclosed embodiments modify and improve over legacy approaches. In particular, the herein-disclosed techniques provide technical solutions that address the technical problems attendant to determination of a style of user authentication at application runtime rather than during application development. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of collaboration systems as well as advances in various technical fields related to application deployment and maintenance.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1 and FIG. 1A2 depict client-server interactions that are carried out in the practice of server-side authentication policy determination, according to some embodiments.

FIG. 2 is a flowchart that depicts a series of operations that are performed to carry out server-side authentication policy determination, according to an embodiment.

DETAILED DESCRIPTION

Figure 1B:
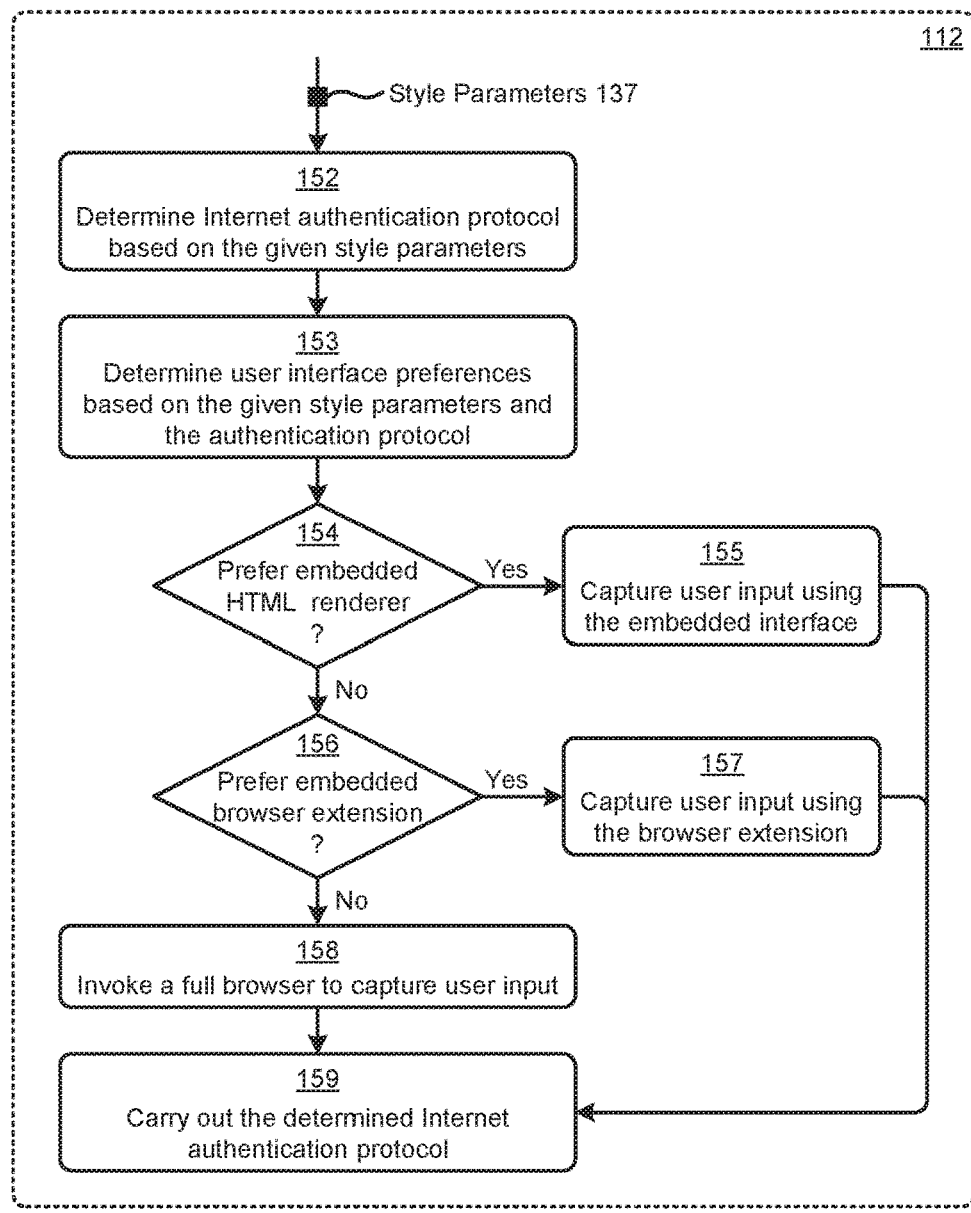
FIG. 1B is a flowchart that depicts a series of operations that are performed to carry out Internet-based authentication, according to an embodiment.

Embodiments in accordance with the present disclosure address the problem of determining a style of user authentication at application runtime rather than during the time of application development. Some embodiments are directed to approaches for deploying applications with authentication style switch logic embedded in the application such that the authentication style (e.g., local/embedded authentication or Internet-based authentication) can be determined by a server each time the application is executed. The accompanying figures and discussions herein present example environments, systems, methods, and computer program products for server-supported authentication policy determination.

Overview

During development of an application (e.g., a mobile application), some technique for authentication needs to be implemented. An application developer might have access to many such techniques, and one of which technique has a respective set of pros and cons. One particular technique is to use an embedded authentication widget such as "WebView". In this case, the developer can control the entire experience, however embedded authentication widgets such as "WebView" cannot get access to certificates that are outside of the application's domain. Another choice might be for the app developer to implement code for the application to access an external browser, however while access through an external browser might provide access to certificates outside of the application's domain, it introduces undesirable effects (e.g., "app flipping") in the user experience. Another choice is to use a web interface component that operates within an embedded browser. Use of such a web interface component (e.g., such as an authentication module in the "Safari View Controller" or such as provided in "Chrome Custom Tabs") addresses the aforementioned scoping issues, however such web interface components introduce a different set of undesired burdens, including the need to embed the browser code into the application and to keep that embedded browser code up to date (e.g., with respect to security vulnerabilities, etc.).

Given the aforementioned pros and cons, and given changing environments in which a mobile application operates, the selection of protocols, and/or the method of presentation of user interface components, and/or determination of other characteristics or styles pertaining to user authentication need to be determined at application runtime rather than during application development time. As discussed hereunder such determinations are facilitated by server-side capabilities that configure and deploy applications that have switch logic embedded in the application such that the protocol(s), interface component(s), and/or other characteristics or styles pertaining to user authentication can be determined by a server each time the application is executed.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1C:
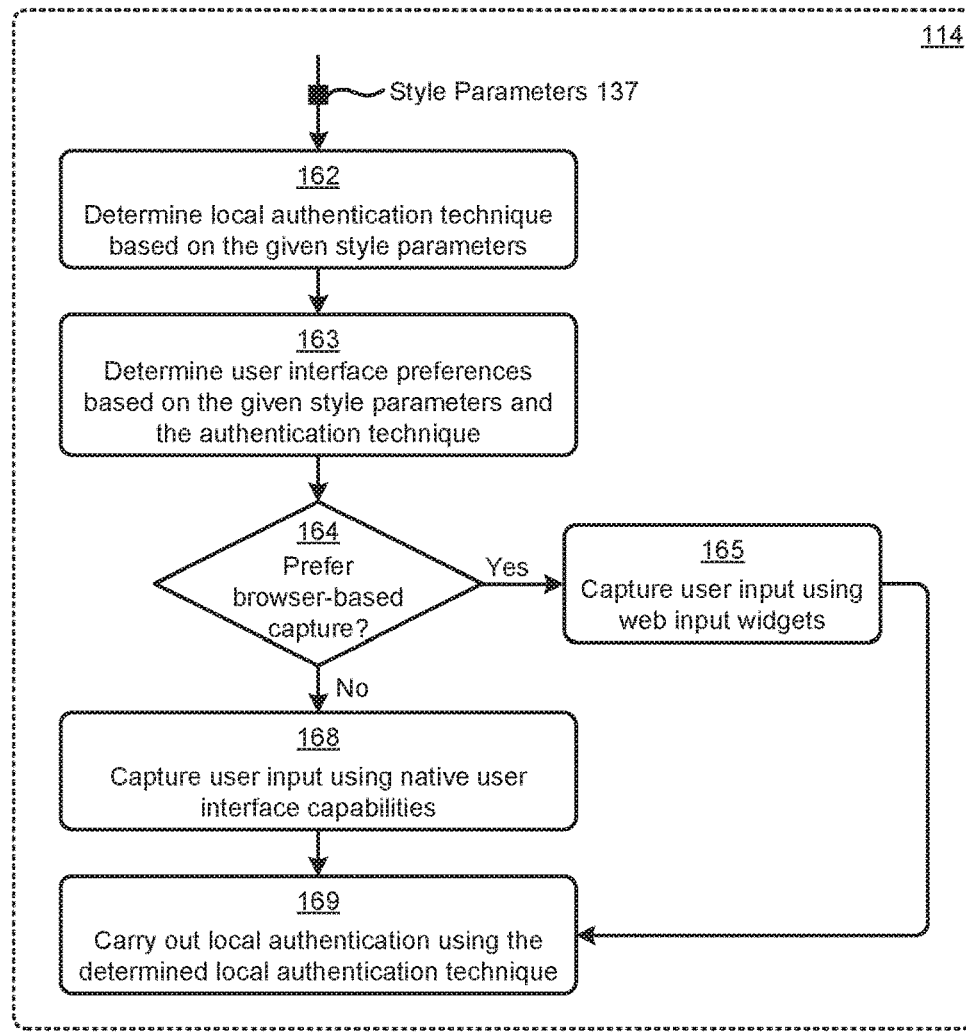
FIG. 1C is a flowchart that depicts a series of operations that are performed to carry out local authentication, according to an embodiment.
Figure 2:
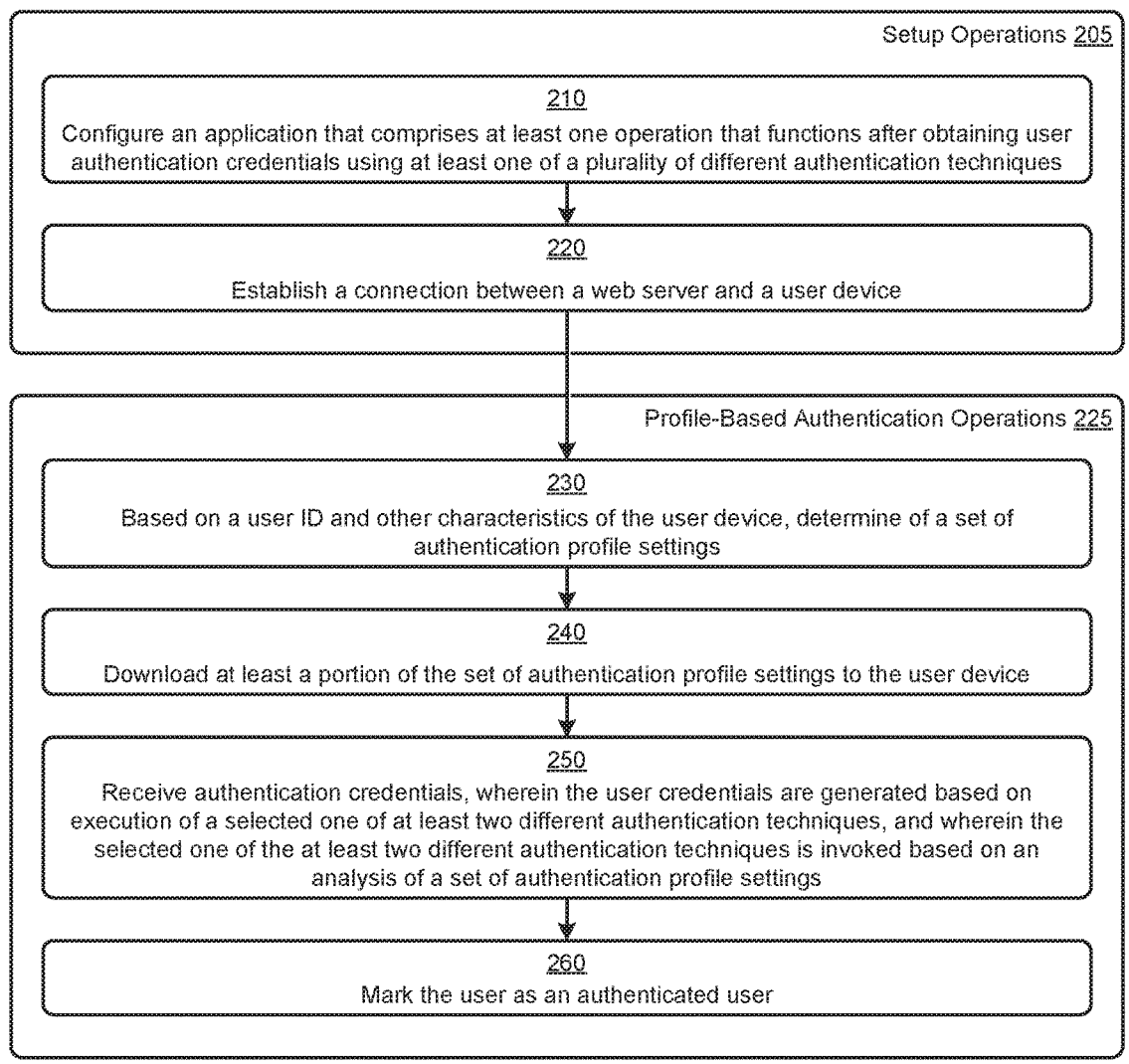

FIG. 1A1 and FIG. 1A2 depict client-server interactions that are carried out in the practice of server-side authentication policy determination. As an option, one or more variations of client-server interactions or any aspect thereof may be implemented in the context of the architecture and functionality of the embodiments described herein. The client-server interactions or any aspect thereof may be implemented in any environment.

As shown in FIG. 1A1, an application server (e.g., web server 120) and a mobile device (e.g., user device 102) are in communication over one or more network components that provide access to the Internet. The mobile device is configured to receive executable code from an application repository 129. As an example, the act of downloading the application to a user device (e.g., from an application repository, possibly involving the shown application server 118) serves to situate an application 104 within the user device 102. The executable code of the application is stored in the memory of the user device. Upon invocation of the application, the user interacts with the application using selected user interface (UI) options (e.g., a local browser-related user interface, an external browser, etc.).

Initially the user of user device 102 is unauthenticated in application 104. However, during or after the course of the user interaction with application 104 through its user interface (at step 106), the logic of the application determines (at step 108) that a style of user authentication is to be established by the application server. The application carries out a communication protocol with the application server. Aspects of the communication protocol between application 104 and the application server include (1) providing an unauthenticated user ID of the user (message 132) to the application server, and (2) providing various device and application parameters (message 134) to the application server. The application server carries out logic that results in an authentication style determination, as well as determination of a set of authentication style parameters, which style parameters are sent to, and received by, user device 102 (via message 136).

Specifically, after receipt of the set of authentication style parameters, application 104 enter a code block 112, which uses any one or more user interaction mechanisms and/or any one or more Internet-accessible authentication servers (e.g., for OAUTH2 authentication). Instructions pertaining to code block 112 serve to carry out an authentication protocol to authenticate the as yet unauthenticated user.

The embodiment of FIG. 1A2 differs from the embodiment of FIG. 1A1 at least in that, after receipt of the set of authentication style parameters, application 104 is operable to "switch", based at least in part on the existence and/or values of the authentication style parameters, any of which can be used to determine an authentication style. As shown, decision 110 serves as a switch that switches based at least in part on a value of one or more authentication style parameters (operation 138) so as to conditionally process along one logical path or another logical path. In this example embodiment the operation of the switching function of decision 110 serves as steering logic to conditionally enter a code block 112 to use any one or more user interaction mechanisms and/or any one or more Internet-accessible authentication servers (e.g., for OAUTH2 authentication). In the shown alternative, operation of the switching function of decision 110 can also serve as steering logic to conditionally enter a code block 114 to use any one or more user interaction mechanisms and/or any one or more authentication techniques. Instructions pertaining to code block 112 authenticate using one or more Internet-based protocols, while instructions pertaining to code block 114 can initiate one or more local authentication protocols.

Specifically, either the instructions that are executed in the processing path of code block 112 or instructions that are executed in the processing path of code block 114 can carry out style-specific authentication (operations 140), which might invoke a particular authentication protocol and/or might present a particular interface component and/or might configure other characteristics or styles pertaining to user authentication.

Still more particularly, taking one of a set of choices of processing paths might take advantage of an embedded authentication user interface or an embedded browser, and that path might be preferable at some moment in time and/or under some then-current operating conditions. However, at some other moment in time and/or under some other operating conditions, it might be preferable to traverse a processing path that performs authentication using other authentication techniques (e.g., more secure authentication), even in the face of additional demands for more user interaction (e.g., possibly involving app "flipping", and/or additional credential verification). As such, processing flow logic down multiple paths are built-in to the mobile application. At runtime, logic is executed to assess the then-current operating conditions and/or the then-current authentication policies, and instructions are executed based at least in part on the results of the logic.

Decision 110 serves as logic to steer execution to one set of instructions or to another set of instructions based at least in part on the then-current conditions. The aforementioned sets of instructions that are executed in the processing path of code block 112 or alternatively in the processing path of code block 114 can be integrated into application 104 using any of a variety of techniques. Strictly as examples, the code block 112 and/or code block 114 can be included in the source code of application 104. In some cases, the instructions that are executed in the processing path of code block 112 derive from a code library or from a publicly-available repository of scripts and/or source code and/or bytecode and/or executable modules.

When traversing down a processing path that uses Internet-accessible authentication techniques, the instructions pertaining to the shown code block 112 that addresses Internet-accessible authentication can be downloaded from a code repository (e.g., from an open-source repository). In the specific case discussed below, a set of publicly-available application programming interfaces (APIs) are called so as to implement the OAUTH2 protocol in the processing path of code block 112. The developer of application 104 integrates OAUTH2 APIs within an integrated development environment (IDE) such as Eclipse. Within the IDE, a library manager can be used to locate the APIs that the application 104 will use. Next, OAUTH2 authorization credentials are generated and saved to a trusted location. In one specific example, Google (e.g., Google's OAuth 2.0 server) is deemed to be a trusted site, and corresponding Google APIs are used to identify the authorization credentials to Google's OAuth 2.0 server, as well as to identify the application 104 to Google's OAuth 2.0 server.

In the alternative, when traversing down a processing path that uses embedded code for authentication (i.e., performing authentication without accessing the Internet), one or more user interaction techniques and one or more local authentication techniques are employed. Strictly as examples, a set of hashed pairs are provided (possibly after being salted against a private key). The hashed pairs serve to verify a match between a username and password. To capture a user-input username and password pair, a user interface, possibly with text input fields, serves to capture a user-entered username (e.g., the string "John@Deer.com") and password (e.g., the string "MyBirthday=1999010"). The combination of the two strings is hashed, and if the resulting hash matches one of the locally-stored hashed pairs, then that username and password pair can be deemed to be authenticated.

As another possibility, when traversing down a processing path that uses embedded code for authentication (i.e., performing authentication without accessing the Internet), one or more user interaction techniques can be employed to validate authentication certificates. Such authentication certificates can be provided in the application 104 at or prior to the time of download, or such authentication certificates can be provided in the application 104 at any time after the download event. For example, authentication certificates can be passed to the user device 102 for delivery to the application 104 any time that the user device is connected to the Internet. In one specific case, authentication certificates can be passed to user device 102 for delivery to application 104 when the application server 118 sends authentication style parameters.

When traversing down a processing path that uses embedded code for authentication, instructions pertaining to the shown code block 114 can be downloaded from a code repository (e.g., from an open-source repository). In this example, the "Safari View Controller" can be integrated into application 104 by bringing in the libraries of the publicly-available web kit (e.g., as available at "www.apple.com").

The embedded Safari View Controller serves as an embedded browser with all of the features of a full browser, including the browser's set of root certificates, which are used for application authentication. Given the facilities of such an embedded browser, the application does not have to context switch between the context of the application 104 and the context of an external browser.

When application 104 executes, it takes one or another path for authentication. Thereafter, once the determined authentication protocol has concluded so as to produce user credentials, the user is deemed to have been authenticated and the user can interact with application 104 to perform various application processing instructions (at step 116).

In the example cases, certain operations of the application processing might perform functions that require authentication (at operation 142). Since the authentication had completed, possibly resulting in delivery of a token to the user device, such functions can be authorized, based at least in part on the previously-performed successful authentication steps.

Returning to the discussion of the message to send authentication style parameters (message 136), the style parameters are determined at application server 118 using the shown authentication style determination module 124, which in turn relies in part on a set of profiles 126 and access to such profiles using the profile access module 122 of web server 120. As shown, profiles 126 hold authentication rules 130 and authentication style settings 128. Some embodiments of the profiles 126 include a wide range of profiles that pertain to the hosting enterprise, and/or a set of users, and/or a set of groups of the enterprise into which the user might be situated etc. Rules, queries, query profile records, security rules (e.g., pre-stored security rules, inherited security rules, etc.), and/or settings can be queried using profile access module 122, which in turn can access the profiles and/or other corpora.

FIG. 1B is a flowchart 1B00 that depicts a series of operations that are performed to carry out Internet-based authentication. The figure is being presented to show a possible flow of operations to capture user input for use with an Internet-based authentication technology. The shown flow commences by receiving style parameters via message 136. Based on the style parameters, a particular one or more of a plurality of Internet authentication protocols can be determined (step 152). Also, based on the style parameters, a particular one or more of a plurality of user interface preferences can be determined (step 153). As an example, the style parameters 137 might specify a particular protocol (e.g., OAUTH2) as well as a particular authorization server (e.g., 75.76, 78.79). After capturing user input (e.g., user authentication credentials) the protocol can be carried out.

One particular user device may have different characteristics from another user device. For example, one user device might be running the "iOS" operating system. Another user device might be running "Android". Based on characteristics of the user device, user interface capabilities and preferences can be determined. The preferences are then observed to the extent that particular preferences are supported on the user device. In some cases, a user device might support many user interface capabilities. More particularly, a user device might support many browser-related user interface components and respective browser-related user interface capabilities. As examples, a user device might support a markup language rendering component, and/or a user device might support an embedded browser, and/or a user device might support an embedded browser extension, and/or a user device might support access to an external web browser.

Preferences can be based partially on capabilities of the user device, including installed software. Preferences can also be based on user interface models. For example, user experiences that use compiled-in user interface capabilities are preferred over user experiences that introduce "app flipping". As such, the more preferred user interface technologies are selected whenever possible. In the depicted flow, a user experience offered by use of a markup language rendering component is preferred over other possibilities. A markup language rendering component is delivered as compiled-in code. As such a markup language rendering component runs in the context of the application process. Strictly as one specific example, a markup language rendering component might include an HTML renderer so as to provide the capability to view web content (e.g., HTML, CSS, JavaScript, etc.). If, at decision 154, the HTML renderer is deemed to be the preferred user interface, then it is used to capture user input (step 155). However, in some situations a markup language rendering component might not be available on the user device, or might not deliver all of the functionality needed. In such cases, alternative user interfaces are considered. Specifically, the "Yes" branch of decision 156 employs an embedded browser extension (via operation of step 157), while the "No" branch of decision 156 employs a full browser (via operation of step 158).

An embedded browser extension is an operating system extension that allows an application to access an embedded browser's functionality, yet without having to incur the unwanted user interface effect of "app flipping". The browser extension operates within the user interface of the host application (e.g., application 104), but runs as its own separate process and is not bound by the process scope of the host application. This allows the host application to browse and render web content and support certain other features of a full browser.

As shown, a third, least preferred possibility involves invoking a full browser (step 158). Use of a full browser has pros and cons. A full browser is a self-contained application, providing full functionality to browse the web. Thus, in addition to providing the user capabilities to view web content, it also supports additional functionality including but not limited to user interaction features such as "back" and "refresh", as well as support of bookmarks, host trust verification, authentication certificate and password stores, etc.

The order of preference depicted in this embodiment is merely one example. Other preferences and other conditions that are considered in making preference determinations may be codified in different orders in different embodiments. For example, whereas a consideration of a particular second preference is followed by consideration of a first preference, such as depicted in FIG. 1B, it can happen in other embodiments that different particular second preference is followed by consideration of a different first preference, and so on.

Irrespective of any particular preference order, when user input has been captured using the determined preferred user interface technique, step 159 is entered to carry out the determined Internet authentication protocol.

As indicated in the foregoing, a markup language rendering component runs in the context of the application process. Details for bringing in a particular markup language rendering component that runs in the context of the application process are given in Table 1.

TABLE 1

Integrating a markup language rendering component into an application

| Ref | Information |
|---|---|
| 1 | import UIKit |
| 2 | import WebKit |
| 3 | class ViewController: UIViewController, WKUIDelegate |
| 4 | { |
| 5 | var webView: WKWebView! |
| 7 | override func loadView( ) { |
| 8 | let webConfigurtion = WKWebViewConfiguration( ) |
| 9 | webView = WKWebView(frame: .zero, configuration: webConfiguration) |
| 10 | webView.uiDelegate = self |
| 11 | view = webView |
| 12 | } |
| 13 | override func viewDidLoad( ) { |
| 14 | super.viewDidLoad( ) |
| 16 | let myURL = URL(string: "https://www.apple.com") |
| 17 | let myRequest = URLRequest(url: myURL!) |
| 18 | webView.load(myRequest) |
| 19 | }} |

FIG. 1C is a flowchart 1C00 that depicts a series of operations that are performed to carry out local authentication (e.g., username/password pairing, hashing, etc.). In some cases, the nature of application 104 is such that local authentication is possible. Furthermore, in some cases, local authentication of one sort or another might be preferred to Internet-based authentication. As such, step 162 serves to examine the style parameters 137 to determine what possibilities for local authentication exist at that moment in time. In some cases, the user input is merely some user-entered text, while in other cases the user input might be more sophisticated, possibly involving local devices such as a fingerprint reader. The shown flow implements determination of preferences and/or capabilities for browser-related (e.g., web-based) capture using web input user interface devices (step 163, decision 164 and step 165) as compared to preferences and/or capabilities that rely, at least in part, on user interface capabilities that are native to the device. If the "No" branch of decision 164 is taken, then step 168 is entered to capture user input based on capabilities provided by the user device.

The order of preference depicted in this embodiment is merely one example. Other preferences and other conditions that are considered in making preference determinations may be codified in different orders in different embodiments. Irrespective of any particular preference order, after the needed user input has been captured, step 169 serves to carry-out local authentication using the determined local authentication technique.

The client-server interactions of FIG. 1A1 and FIG. 1A2 can be carried out by system components that perform various setup operations and ongoing operations. One such set of setup operations and ongoing operations is shown and described as pertains to FIG. 2.

FIG. 2 is a flowchart 200 that depicts a series of operations that are performed to carry out server-side authentication policy determination. As an option, one or more variations of flowchart 200 or any aspect thereof may be implemented in the context of the architecture and functionality of the embodiments described herein. The flowchart 200 or any aspect thereof may be implemented in any environment.

The embodiment shown in FIG. 2 is merely one example. As shown, the flowchart 200 includes setup operations 205 and profile-based authentication operations 225. The functions underlying the setup operations include operations 210 for configuring an application. Such configuration operations can be performed by a developer and/or by operational components of application server 118. In example embodiments, the application comprises operations that function after obtaining user authentication credentials and/or a token that is issued based at least in part on successful authentication.

For purposes of interaction between the user device and the application server, step 220 serves to establish a network connection. Such a connection does not demand authentication of the user or the user device. As shown in the setting of FIG. 1A and FIG. 1A2, the user and the device are at least partially identified or characterized. As such, and returning to the discussion of message 132 and message 134, merely some indication of the nature of the user and some indication of the identification of the user device and/or its parameters are sent to the application server. In particular, step 230 of the shown set of profile-based authentication operations 225 serves to lookup or otherwise determine at least some authentication profile settings. Such determined authentication profile settings can be used singly or in combination to determine a style of authentication. The determined authentication profile settings can be used singly or in combination by or with the application server to determine a style of authentication, or the determined authentication profile settings can be used singly or in combination by the user device to determine a style of authentication. The determined style of authentication is observed by operation of the switching logic of decision 110. Step 240 serves to download, to the user device, at least a portion of the set of authentication profile settings that were determined in step 230.

At the user device, the switching logic of decision 110 steers to a processing path based at least in part on the authentication style that was determined by the server (e.g., by operation of step 230). Step 250 serves to carry out authentication in the determined style. Regardless of the processing path taken, the user device receives authentication credentials (e.g., upon performance of operation 140 of FIG. 1A or upon performance of operation 140 of FIG. 1A2). The user credentials are generated by an authentication authority such as an authentication server that can be distinct from the application server. When authentication credentials and/or a token is provided to the user device, the user is deemed to be authenticated (step 260) and, based at least in part on the authentication token, the user can be granted access tokens so as to permit performance of functions that require authentication and authorizations or permissions.

Figure 3:
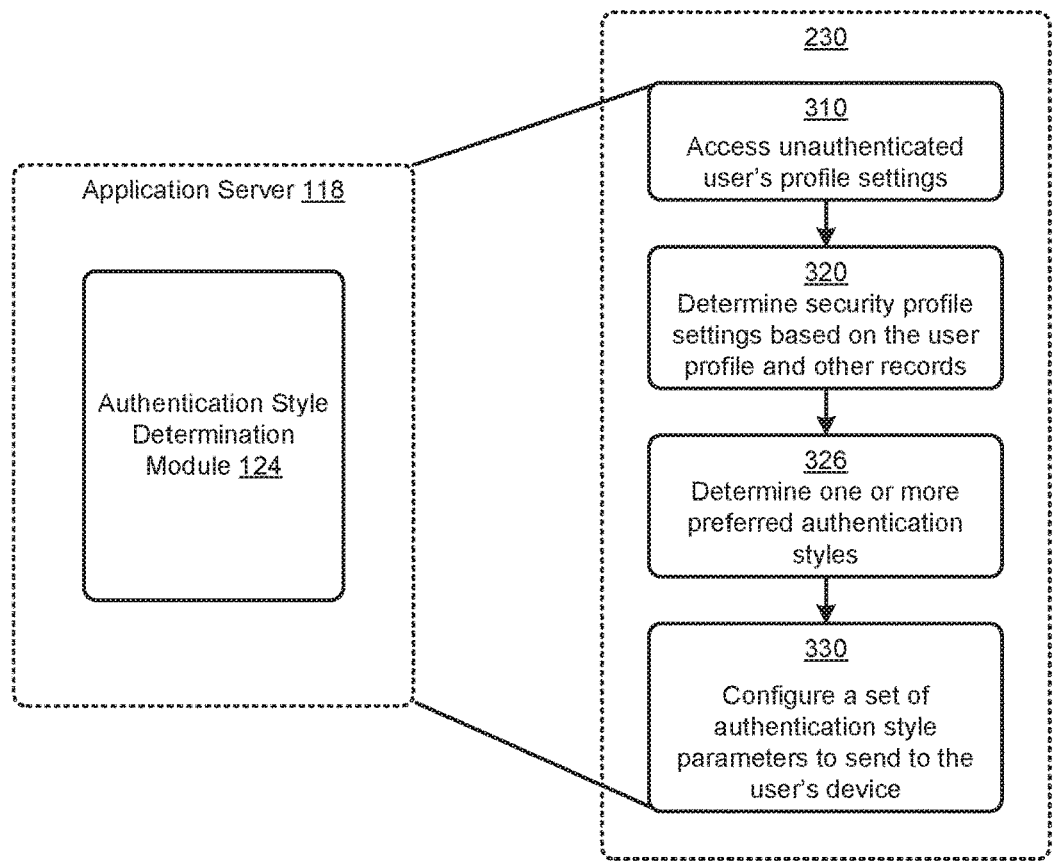
FIG. 3 is a system for facilitating profile-based authentication policy determination, according to an embodiment.

As earlier indicated, the determination of the authentication server and/or the determination of the authentication protocol to be observed can be based at least in part on execution of a particular selected one of at least two different authentication procedures. The selected one of the authentication procedures is invoked by the user device. Such invocation is based at least in part on an analysis of a set of authentication profile settings, which analysis was performed by the application server. The following FIG. 3 shows and describes one technique whereby a server such as application server 118 can access profiles and other data to reach a profile-based authentication policy determination, which is then transmitted to the user device in the form of a set of configuration style parameters. One technique for making a profile-based authentication policy determination is shown and described as pertains to FIG. 3.

FIG. 3 is a system 300 for facilitating profile-based authentication policy determination. As an option, one or more variations of system 300 or any aspect thereof may be implemented in the context of the architecture and functionality of the embodiments described herein. The system 300 or any aspect thereof may be implemented in any environment.

The embodiment shown in FIG. 3 is merely one example. The system 300 depicts an authentication style determination module 124 as a component within application server 118. The authentication style determination module 124 in turn includes logic to carry out instructions of step 230. Specifically, step 310, step 320, step 326, and step 330 serve to lookup, retrieve, or otherwise determine at least some user profile settings (step 310), including user profile settings pertaining to a yet unauthenticated user. Any combination of the unauthenticated user's profile settings (e.g., his/her department, role, location, security clearance, etc.) can be used to resolve to at least one security profile setting (step 320), which in turn is used for subsequent authentication. Based at least in part on the results of carrying out step 320, step 320 determines at least one preferred authentication style. In some cases, multiple authentication styles are permitted, in which case the multiple permitted authentication styles are associated with an order indication, which association and/or order indication is codified to be communicated to a user device.

Step 330 serves to configure a set of style parameters to be communicated to a user device (e.g., using message 136). The style parameters communicated to the user device might include a particular style or protocol identified by name (e.g., OAuth2, SAML, JWT, etc.) and/or a particular authentication server to be accessed. Furthermore, the style parameters communicated to the user device might include settings, variables and/or parameters that are used in performance of the named protocol or style.

Strictly as one example, the style parameters communicated to the user device might include setting or preference selections and/or parameter values (e.g., OAut2 parameters, a base URL for a proxy, preferences, limits or biases for authentication style, etc.) and/or, as another example, the style parameters communicated to the user device might include setting or preference selections and/or parameter values pertaining to preferences and/or capabilities that pertain to use of a local/embedded authentication module or use of an Internet-based authentication module.

As earlier indicated, the style parameters might include a particular authentication server to be accessed. Techniques whereby the user device acts on the basis of a set of authentication style parameters (e.g., to access a particular authentication server) is shown and described as pertains to FIG. 4.

Figure 4:
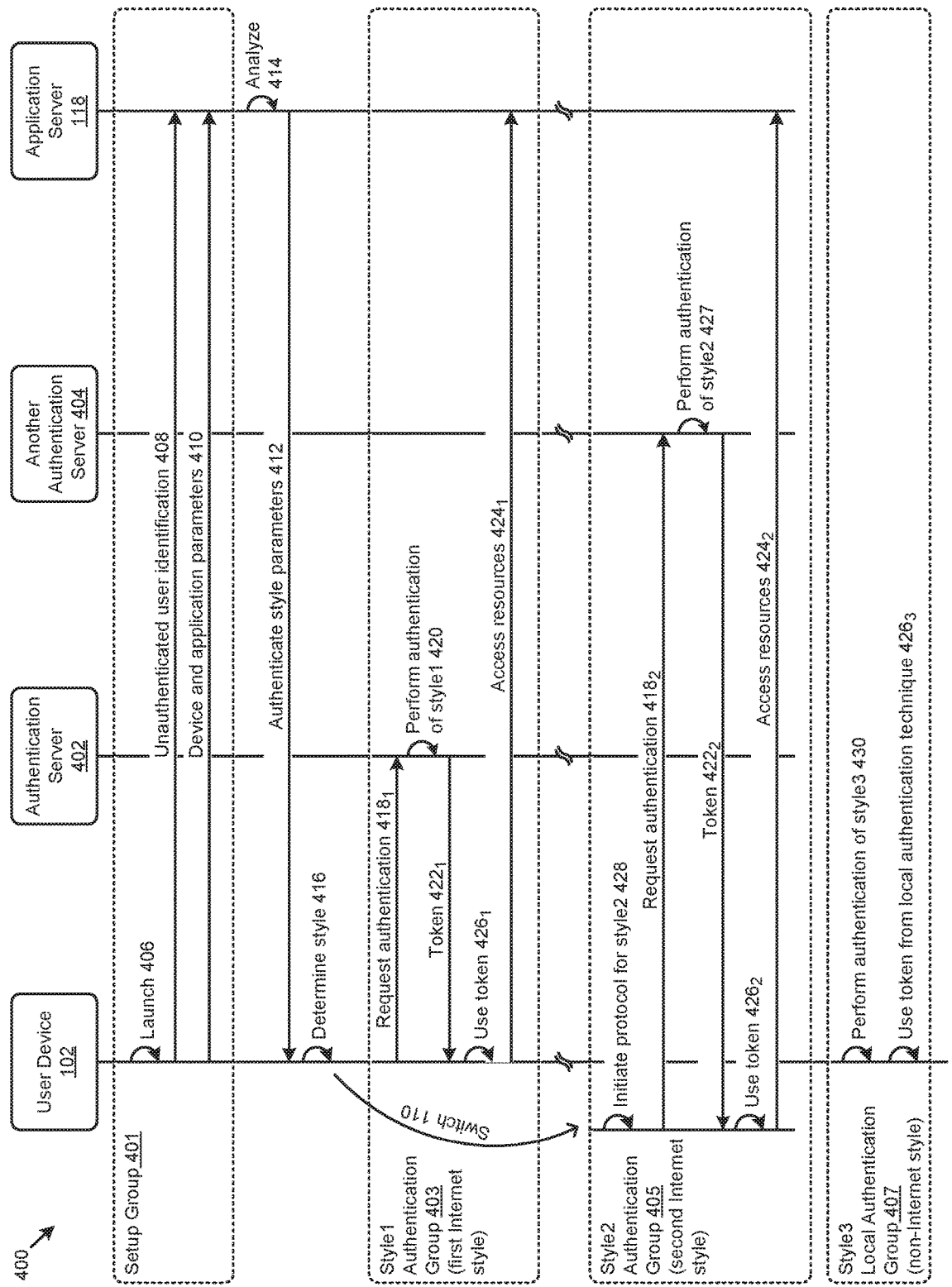
FIG. 4 exemplifies a protocol for facilitating profile-based authentication policy determination, according to an embodiment.

FIG. 4 exemplifies a protocol 400 for facilitating profile-based authentication policy determination. As an option, one or more variations of protocol 400 or any aspect thereof may be implemented in the context of the architecture and functionality of the embodiments described herein. The protocol 400 or any aspect thereof may be implemented in any environment.

As shown, the environment in which protocol 400 is carried out includes a user device 102 in communication with an application server 118. The environment further includes an authentication server 402 and another authentication server 404. Within the shown setup group 401, the application is launched (operation 406). Messaging logic within the application sends user identification of the yet unauthenticated user (message 408) to the application server 118. Additional messaging and other logic within the application sends user device and application parameters (message 410). Such messaging precipitates action by application server 118 to analyze (via operation 414) the incoming messages with respect to any profiles accessible to application server 118. Such analysis results in at least one set of authentication style parameters, at least some of which are sent to the user device (message 412).

Based at least in part on the authentication style parameters, and authentication style can be determined. Three different authentication styles are shown in FIG. 4. Determination to use style1 (or not) is made at operation 416. If style1 is to be used (e.g., a first style of Internet-based authentication), then decision 110 of user device 102 routes processing so that the protocol continues to the style1 authentication group 403. Otherwise, and as shown, if style2 is to be used (e.g., a second style of Internet-based authentication), then the protocol continues to the style2 authentication group 405. Otherwise, a third style is used (e.g., a local non-Internet style), then the protocol continues to the style3 local non-internet style authentication group 407. When using local non-Internet style authentication, the Internet is not accessed and, instead, authentication is performed using a local authentication module that is embedded within the application.

The style1 authentication group 403 includes protocol exchanges to request, from an authentication server, user authentication (message $418_1$) in accordance with authentication style1 (operation 420). If the user can be authenticated using authentication style1, then the authentication server returns a token (via message $422_1$) to the user device. The application running on user device 102 can then use the token $426_1$ to access resources of application server 118. Access to any set of resources can be accomplished using messaging (e.g., message $424_1$), which messaging possibly includes an application-specific payload.

As earlier indicated, and as shown, if an authentication style other than style1 is to be used, then the protocol continues to the style2 authentication group 405. The style2 authentication group 405 initiates (at operation 428) a protocol exchange to request (e.g., from an alternate authentication server), user authentication (e.g., via message $418_2$) in accordance with authentication style2 (operation 427). If the user can be authenticated using authentication style2, then the alternate authentication server returns a token (via message $422_2$) to the user device. The application running on user device 102 can then use token $426_2$ access resources of application server 118. Access to any set of resources can be accomplished using messaging (e.g., message $424_2$), which messaging possibly includes application-specific payload.

Referring to local authentication group 407, authentication is performed using local authentication (i.e., the Internet is not accessed and authentication is performed instead using a local authentication module that is embedded into the application). This is shown by operation 430 and operation $426_3$. Operations for authentication as well as for the generation of an authorization token are performed locally, within the application—without reliance on Internet-accessible resources.

Figure 5:
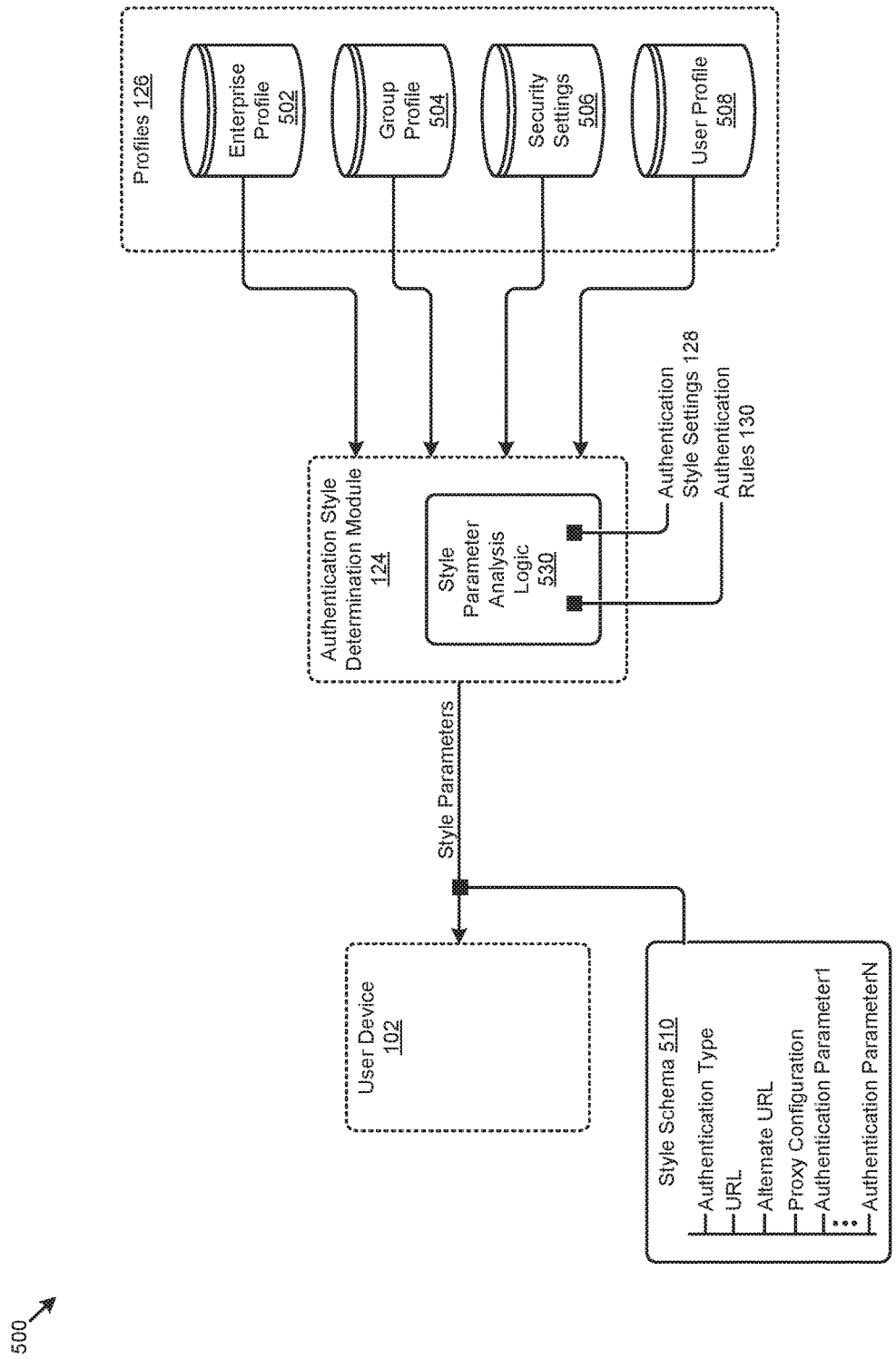
FIG. 5 exemplifies a dataflow for facilitating profile-based server-side authentication policy determination, according to an embodiment.

FIG. 5 exemplifies a dataflow 500 for facilitating profile-based server-side authentication policy determination. As an option, one or more variations of dataflow 500 or any aspect thereof may be implemented in the context of the architecture and functionality of the embodiments described herein. The dataflow 500 or any aspect thereof may be implemented in any environment.

As shown, the authentication style determination module 124 accesses data from the set of profiles 126, processes information found in the set of profiles 126, possibly in combination with any authentication style settings 128 and/or authentication rules 130. The processing results in style parameters that comport with shown style schema 510.

The set of profiles 126 might include any one or more sets of sub-profiles such as the shown enterprise profile 502, a group profile 504, a set of security settings 506, and/or one or more user profiles 508. Strictly as examples, any one or any combinations of shown enterprise profile 502, the group profile 504, the set of security settings 506, and/or any one or more user profiles 508 can be used to determine an authentication style and corresponding style parameters and their values. The enterprise profile 502 might include administratively-configured settings to support certain types of authentication methods on the client. In some cases, URLs or other parameters or identification information that facilitate performance of authentication are used to determine an authentication style and corresponding style parameters/values. In some cases, rules pertaining to user identification and/or a user's roles and/or any sets of rules pertaining to the particulars of the user's device are used to determine authentication styles. In some cases, application of the rules may permit multiple styles to be used. In such cases, additional intrinsic and extrinsic factors might be used to resolve to a single authentication style.

Any of the foregoing may be combined with still further rules (e.g., enterprise-centric rules) that are available for use to determine an authentication style. Rules can be organized into precedence groups and/or hierarchies, and any rules organized as such can be codified into any one or more profiles (e.g., group profile 504, user profiles 508, and/or security settings 506). Strictly as an example, an enterprise might seek to enforce a rule to require multiple device authentication for any user that has two or more registered user devices.

The authentication style determination module 124 might include style parameter analysis logic 530 that processes the set of profiles 126 and any authentication style settings 128 in accordance with the functioning of authentication rules 130 and/or heuristics. Strictly as examples, an enterprise profile might include information that causes a particular rule to fire. Such a particular rule might require that a particular authentication server should be used, and further that the particular authentication server should be accessed from a particular URL (e.g., as shown in style schema 510). As another example, group profile 504 might contain information that fires a rule to combine group profile information and user profile information to determine options for performing multiple device authentication. Still further, the set of security settings 506 might include any further sets of authentication style parameters (e.g., such as shown in style schema 510).

Based at least in part on rules and/or any precedence or hierarchy, a different technology for a first style (e.g., for traversal through code block 112) and/or a different technology for a second style (e.g., for traversal through code block 114) may be determined and enforced. Specific techniques for enforcement may be based at least in part on the characteristics of user device 102. For example, if the device is not running the latest OS updates, then a more restrictive authentication method might be enforced.

Additional Embodiments of the Disclosure

Additional Practical Application Examples

Figure 6:
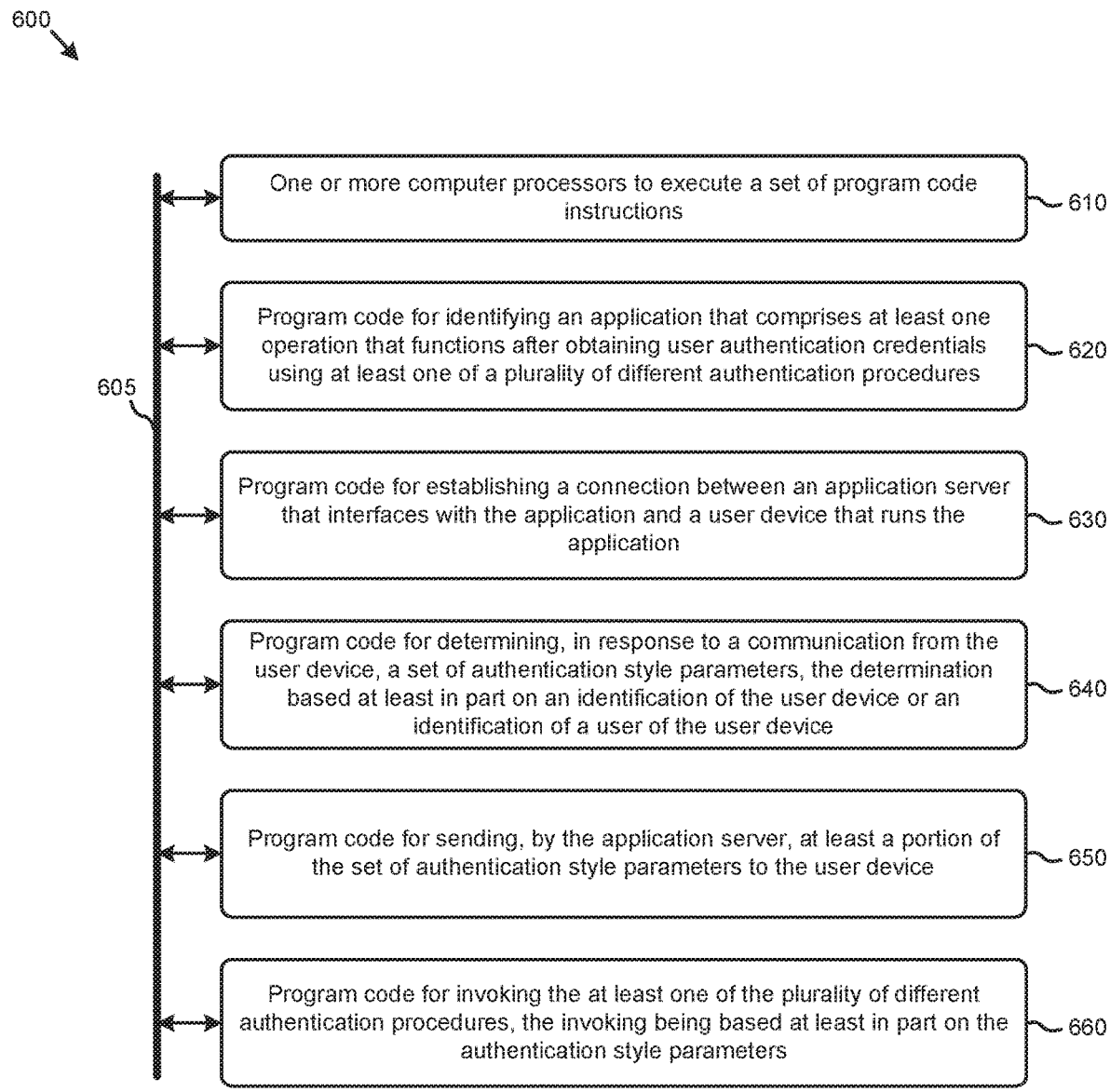
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: identifying an application that comprises at least one operation that functions after obtaining user authentication credentials using at least one of a plurality of different authentication procedures (module 620); establishing a connection between an application server that interfaces with the application and a user device that runs the application (module 630); determining, in response to a communication from the user device, a set of authentication style parameters, the determination based at least in part on an identification of the user device or an identification of a user of the user device (module 640); sending, by the application server, at least a portion of the set of authentication style parameters to the user device (module 650); and invoking the at least one of the plurality of different authentication procedures, the invoking being based at least in part on the authentication style parameters (module 660).

Variations of the foregoing may include more or fewer of the shown modules. Certain variations may perform more or fewer (or different) steps and/or certain variations may use data elements in more or in fewer (or different) operations.

System Architecture Overview

Additional System Architecture Examples

Figure 7A:
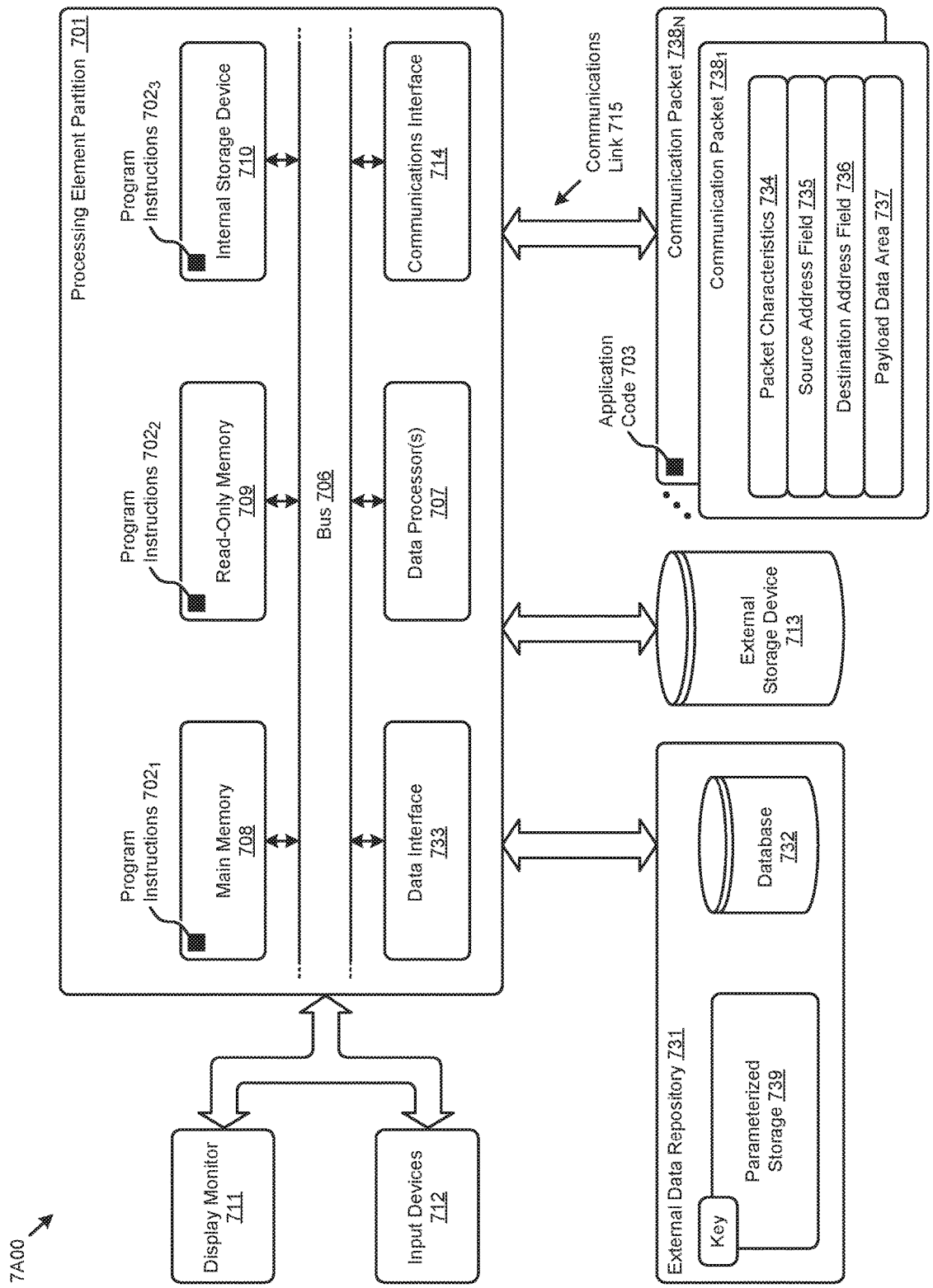
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to server-supported authentication policy determination. A module may include one or more state machines and/or combinational logic used to implement or facilitate the operational and/or performance characteristics pertaining to server-supported authentication policy determination.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of server-supported authentication policy determination). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to server-supported authentication policy determination, and/or for improving the way data is manipulated when performing computerized operations pertaining to deploy an application with authentication style switch logic embedded in the application such that the authentication style can be determined by a server each time the application is executed.

Figure 7B:
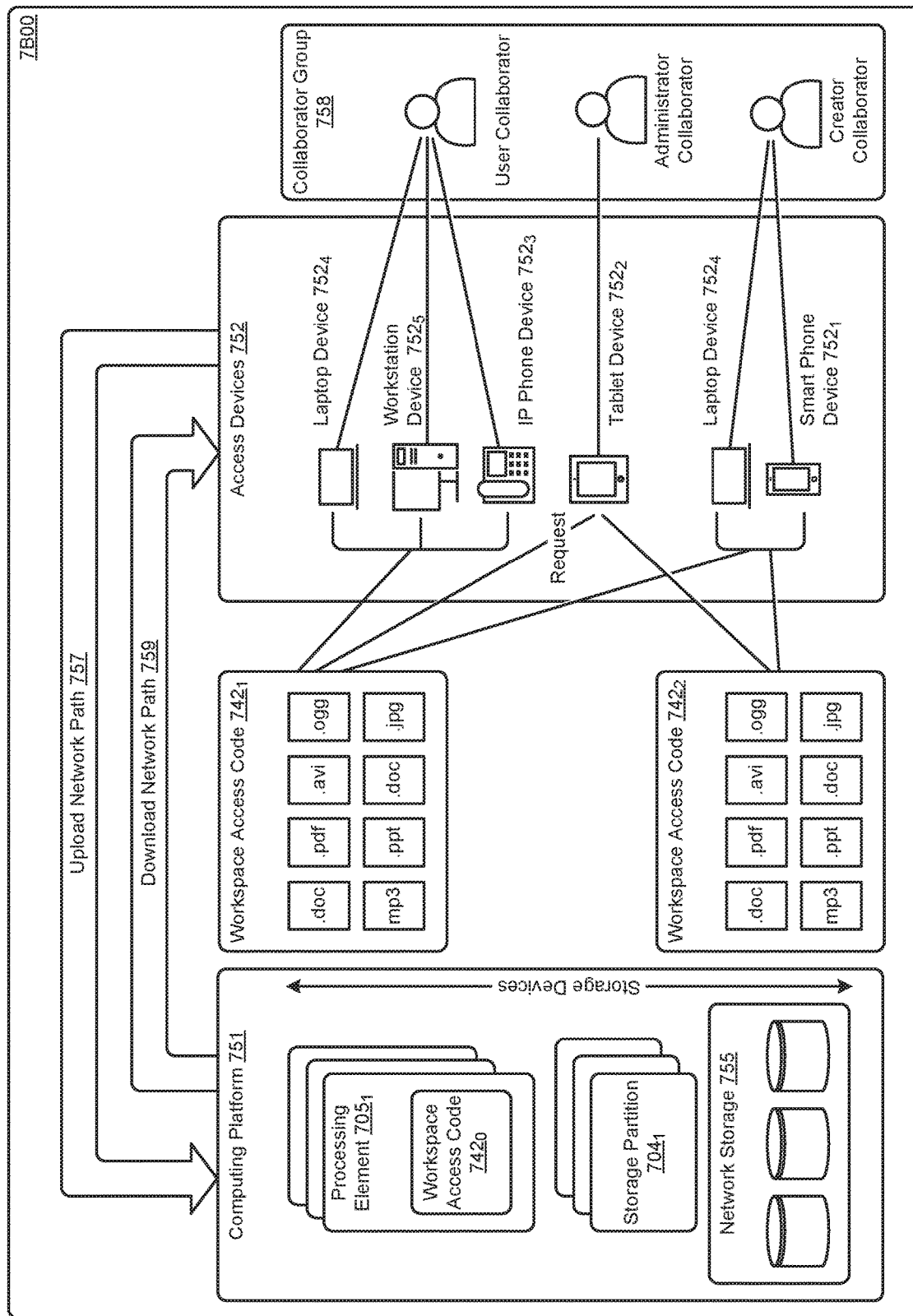

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for user authentication, the method comprising:
   identifying an application that comprises at least one operation that functions after using at least one of a plurality of different authentication procedures;
   configuring the application to invoke the at least one of the plurality of different authentication procedures based at least in part on a set of authentication style parameters;
   determining, in response to a communication from the user device via a connection between the application server and the device executing the application, the set of authentication style parameters, the determination based at least in part on an identification of the user device or an identification of a user of the user device; and
   sending, by the application server, at least a first subset and a second subset of the set of authentication style parameters to the user device that conditionally initiates an authentication procedure in a list of authentication procedures in the application based at least in part upon the first or the second subset, the list comprising a first authentication procedure and a second authentication procedure, wherein
      the first authentication procedure is initiated by execution of a first code block within the application, the first code block transmitted from a remote code repository to the user device via a network element when the application is executing and presenting a first set of one or more first user interface components for authenticating the user for the application, and
      when the second authentication procedure is used for authentication, a second set of one or more second user interface components is used on the user device for authenticating the user, the first set different from the second set.

2. The method of claim 1, configuring the application comprising identifying a first processing path in execution of the application, wherein the first processing path enters the first code block for the first authentication procedure when the application is executing, and the first code block is transmitted to the application on the user device when the application is executing, rather than at development time of the application.

3. The method of claim 1, further comprising transmitting, to the user device, one or more authorizations to access resources of the application server or transmitting authentication credentials from a server remote to the user device, and the one or more authorizations to access resources of the application server are provided as access tokens.

4. The method of claim 1, wherein
   the first code block transmitted to the user device presents a first browser interface component for a browser extension embedded within the application or a browser on the user device,
   a second coded block within the application initiates a separate authentication procedure for authenticating the user for the application, the second code block presents a second browser interface component for the browser extension or the browser on the user device, and the second code block is transmitted from the remote code repository or a different remote code repository to the user device when the application is executing on the user device.

5. The method of claim 1, wherein the second authentication procedure comprises a second code block embedded in the application, the second code block is entered into during execution of the application for authenticating the user without access to Internet, and authentication data is delivered from the application server or from a remote server to the user device after the user device has the access to the Internet.

6. The method of claim 1, further comprising configuring the application with at least one of, at least a portion of an embedded authentication module, or at least a portion of a first Internet-based authentication technology, or at least a portion of a second Internet-based authentication technology.

7. The method of claim 1, wherein the at least one of the plurality of different authentication procedures comprises at least one of a Web View technology, or a Safari View Controller technology, or a Chrome Custom Tabs technology, or a local authentication procedure that requires no access to Internet.

8. The method of claim 1, wherein at least one of the plurality of different authentication procedures comprises at least one set of hashed pairs, a hashed pair comprises hashing a combination of multiple strings in the hashed pair.

9. The method of claim 1, wherein an embedded authentication procedure of the plurality of different authentication procedures comprises at least one authentication certificate, wherein the user is authenticated with the embedded authentication procedure that at least validates the authentication certificate to authenticate the user when the user device has no access to Internet.

10. A non-transitory computer readable medium having stored thereon a sequence of instructions which, when stored in memory and executed by one or more processors, causes the one or more processors to perform a set of acts for user authentication, the set of acts comprising:
identifying an application that comprises at least one operation that functions after using at least one of a plurality of different authentication procedures;
configuring the application to invoke the at least one of the plurality of different authentication procedures based at least in part on a set of authentication style parameters;
determining, in response to a communication from the user device via a connection between the application server and the device executing the application, the set of authentication style parameters, the determination based at least in part on an identification of the user device or an identification of a user of the user device; and
sending, by the application server, at least a first subset and a second subset of the set of authentication style parameters to the user device that conditionally initiates an authentication procedure in a list of authentication procedures comprising a first authentication procedure or a second authentication procedure based at least in part upon the first or the second subset, wherein
the first authentication procedure is initiated by execution of a first code block within the application, the first code block transmitted from a remote code repository to the user device via a network element when the application is executing and presenting a first set of one or more user interface components for authenticating the user for the application, and when the second authentication procedure is used for authentication, a second set of one or more user interface components are used on the user device for authenticating the user for the application, the first set different from the second set.

11. The computer readable medium of claim 10, the sequence of instructions for configuring the application further comprising instructions which, when stored in the memory and executed by the one or more processors, causes the one or more processors to perform acts of identifying a first processing path in execution of the application, wherein the first processing path enters the first code block for the first authentication procedure when the application is executing, and the first code block is transmitted to the application on the user device when the application is executing, rather than at development time of the application.

12. The computer readable medium of claim 10, further comprising instructions which, when stored in memory and executed by the one or more processors causes the one or more processors to perform acts of receiving, by the user device, one or more authorizations to access resources of the application server or receiving authentication credentials from an authentication server, and the one or more authorizations to access resources of the application server are provided as access tokens.

13. The computer readable medium of claim 10, wherein
the first code block transmitted to the user device presents a first browser interface component for a browser extension embedded within the application or a browser on the user device,
a second coded block within the application initiates a separate authentication procedure for authenticating the user for the application,
the second code block presents a second browser interface component for the browser extension or the browser on the user device, and
the second code block is transmitted from the remote code repository or a different remote code repository to the user device when the application is executing on the user device.

14. The computer readable medium of claim 10, wherein the second authentication procedure comprises a second code block embedded in the application, the second code block is entered into during execution of the application for authenticating the user without access to Internet, and authentication data is delivered from the application server or from a remote server to the user device after the user device has the access to the Internet.

15. The computer readable medium of claim 10, further comprising instructions which, when stored in memory and executed by the one or more processors causes the one or more processors to perform acts of configuring the application with at least one of, at least a portion of an embedded authentication module, or at least a portion of a first Internet-based authentication technology, or at least a portion of a second Internet-based authentication technology.

16. The computer readable medium of claim 10, wherein the at least one of the plurality of different authentication procedures comprises at least one of a Web View technology, or a Safari View Controller technology, or a Chrome Custom Tabs technology, or a local authentication procedure that requires no access to Internet.

17. The computer readable medium of claim 10, wherein at least one of the plurality of different authentication procedures comprises at least one set of hashed pairs, a hashed pair comprises hashing a combination of multiple strings in the hashed pair.

18. The computer readable medium of claim 10, wherein an embedded authentication procedure of the plurality of different authentication procedures comprises at least one authentication certificate, wherein the user is authenticated with the embedded authentication procedure that at least validates the authentication certificate to authenticate the user when the user device has no access to Internet.

19. A system for user authentication, the system comprising:
a non-transitory storage medium having stored thereon a sequence of instructions; and
one or more processors that execute the sequence of instructions, execution of the sequence of instructions causing the one or more processors to perform a set of acts, the set of acts comprising,
identifying an application that comprises at least one operation that functions after using at least one of a plurality of different authentication procedures;
configuring the application to invoke the at least one of the plurality of different authentication procedures based at least in part on a set of authentication style parameters;
determining, in response to a communication from the user device via a connection between the application server and the device executing the application, the set of authentication style parameters, the determination based at least in part on an identification of the user device or an identification of a user of the user device; and
sending, by the application server, at least a first subset and a second subset of the set of authentication style parameters to the user device that conditionally initiates an authentication procedure in a list of authentication procedures in the application based at least in part upon the first or the second subset, the list comprising a first authentication procedure and a second authentication procedure, wherein
the first authentication procedure is initiated by execution of a first code block within the application, the first code block transmitted from a remote code repository to the user device via a network element when the application is executing and presenting a first set of one or more user interface components for authenticating the user for the application, and
when the second authentication procedure is used for authentication, a second set of user interface components is used on the user device for authenticating the user, the first set different from the second set.

20. The system of claim 19, wherein configuring the application comprises identifying a first processing path in execution of the application, wherein the first processing path enters the first code block for the first authentication procedure when the application is executing, and the first code block is transmitted to the application on the user device when the application is executing, rather than at development time of the application.

* * * * *